FIG. I

INVENTOR
WALTER R. HAHS
BY Sughrue, Rothwell, Mion & Zinn
ATTORNEYS

April 3, 1962 W. R. HAHS 3,028,552

FREQUENCY SHIFTING CLOCK

Filed April 20, 1960 6 Sheets-Sheet 2

April 3, 1962 W. R. HAHS 3,028,552

FREQUENCY SHIFTING CLOCK

Filed April 20, 1960 6 Sheets-Sheet 4

United States Patent Office 3,028,552

Patented Apr. 3, 1962

3,028,552

FREQUENCY SHIFTING CLOCK

Walter R. Habs, Wappingers Falls, N.Y., assignor to International Business Machines Corporation, New York, N.Y., a corporation of New York Filed Apr. 20, 1960, Ser. No. 23,459
10 Claims. (Cl. 328—55)

This invention relates in general to self-clocking systems for binary data signals, and, more particularly, to a system for clocking binary data signals which exhibit changes in their average repetition rate.

Generally, in order to recover the information contained in a binary coded digital data signal, the signal must be sampled at each bit time. A bit time may be defined as an interval of time during which a binary "1" or a binary "0" occurs. In many systems, a binary "1" is indicated by the presence of a pulse, while a binary "0" is represented by the absence of a pulse. This sampling operation, referred to in the art as "clocking," is accomplished under the control of a clock signal and provides a clock pulse at each bit time. In situations where the frequency or bit rate of the data signal does not vary, the sampling operation creates little or no problem, in that a stable oscillator having a signal frequency corresponding to the bit rate of the data signal may be provided, and once the two different signal trains are synchronized, the sampling may proceed without incident.

In some situations the bit rate of the binary coded data signal is not constant, but varies slowly over a small range of frequencies. Such an instance is best exemplified in the case where the binary data signal is being generated by a transducer scanning a magnetic record. It will be seen that the bit rate of the data signal is directly related to the scanning rate, and hence when the scanning rate changes the data signal is no longer in synchronism with a clock signal derived from an independent oscillator.

In order to avoid the problem caused by changes in the scanning rate, the prior art has suggested recording a permanent clock track on the recording surface so that if the scanning rate varies, the frequency of both data and clock signals are affected in the same manner and, hence, are maintained in synchronism. While this clocking arrangement undoubtedly has many advantages, it also has some limitations, particularly where more than one cyclic record carrier is employed with a common clock track, where more than one reading transducer is employed with a common recording path, and where the reading transducer is moved to different recording paths.

To avoid the problems encountered with a pre-recorded clock track, the present invention discloses a frequency shifting clock pulse generator which receives data bit pulses from a varying rate source, such as a magnetic surface whose driven speed is changing, and shifts the frequency of the output clock pulses to one of a plurality of different discrete frequencies depending upon which one of the plurality of frequencies most closely corresponds to the frequency of the bit pulses. In the preferred embodiment of the invention, the above-mentioned plurality of frequencies are three in number and are chosen to correspond to the nominal, worst case high, and worst case low frequencies of the data bit pulses. Furthermore, during periods when no bit pulses are being produced, which in many cases corresponds to an indication of binary "0," the frequency shifting clock will provide output clock pulses at the average frequency of the last few data bit pulses received by it from the scanning means.

It is therefore an object of the present invention to provide a frequency shifting clock generator responsive to data bit pulses coming from a varying rate source which comprises a clock pulse producing means, a plurality of clock delay means, each of which is operative when selectively connected in said clock pulse producing means to cause the pulse producing means to produce clock pulses at a different fixed rate, means connected to said pulse producing means for transmitting said clock pulses, means for determining which of the fixed rates would be closest to the rate that the data bits are coming from said source, and means under control of said determining means for selectively connecting in circuit the particular delay means that causes the pulse producing means to produce clock pulses at a rate closest to the rate the data bits are coming from said source.

A further object of the present invention is to provide a frequency shifting clock generator which comprises a clock pulse recirculating loop circuit, and means responsive to data bit pulses from a varying rate source for varying the pulse recirculation time of said loop circuit.

Another object of the present invention is to provide a frequency shifting clock generator which comprises a clock pulse recirculating loop circuit containing first means responsive to data bit pulses from a varying rate source for varying the pulse recirculation time of said loop circuit in discrete steps, and second means responsive to said data bit pulses for varying the pulse recirculation time in linear fashion.

A yet further object of the present invention is to provide a frequency shifting clock which is responsive only to the average repetition rate taken over a particular period of time of bit pulses from a varying rate source.

Other objects and advantages of the present invention will be set forth in the following description which is to be taken in connection with the accompanying drawings, in which.

Figure 2:
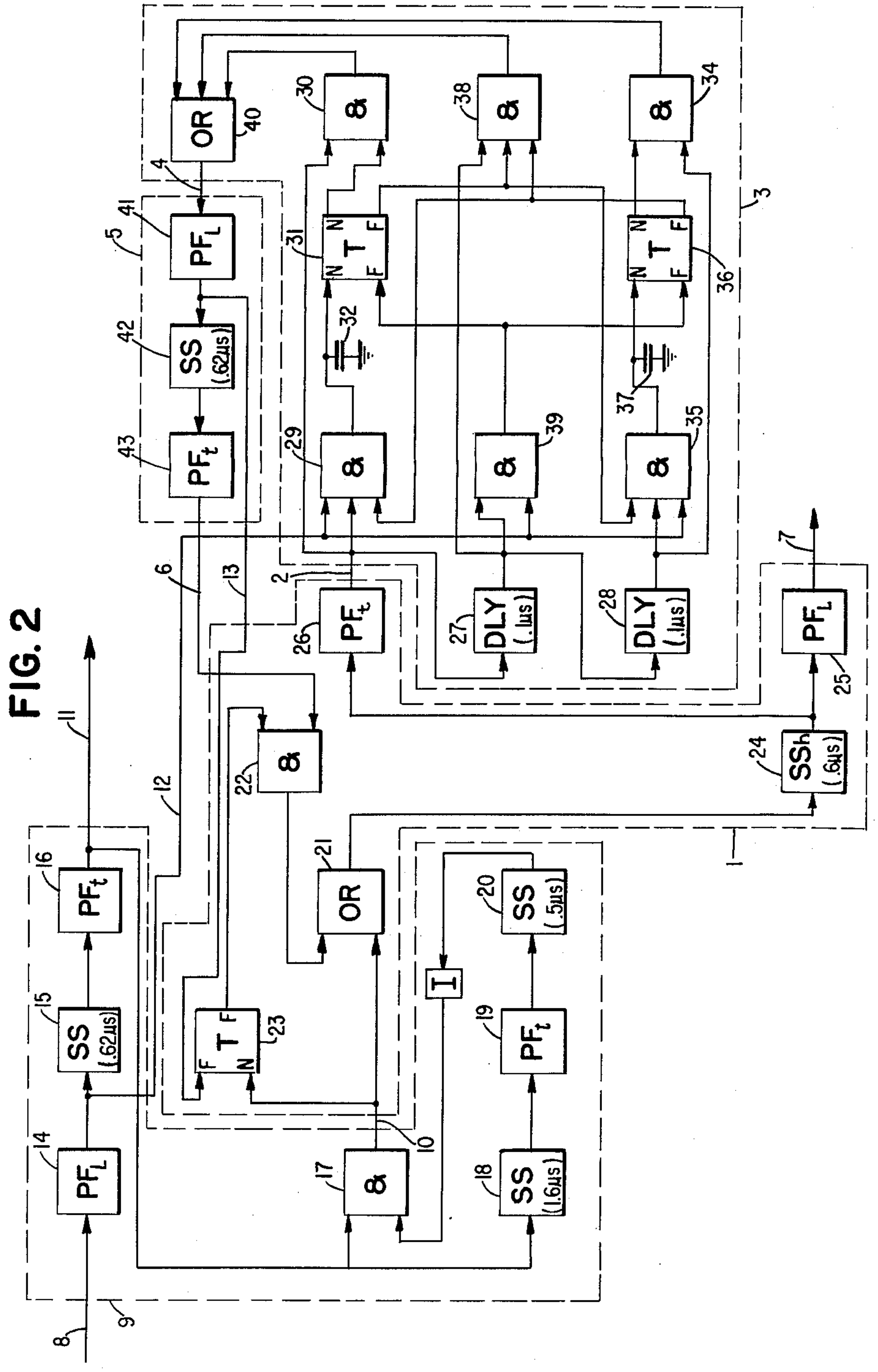
FIGURE 2 shows the logic diagram of the frequency shifting clock.
Figure 3A:
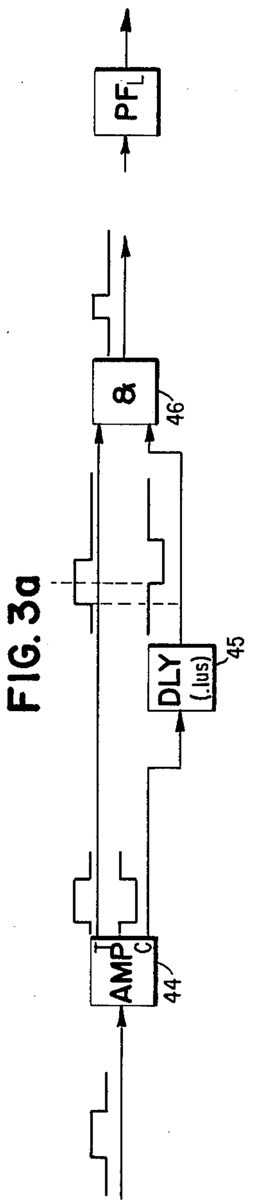
Figure 3B:
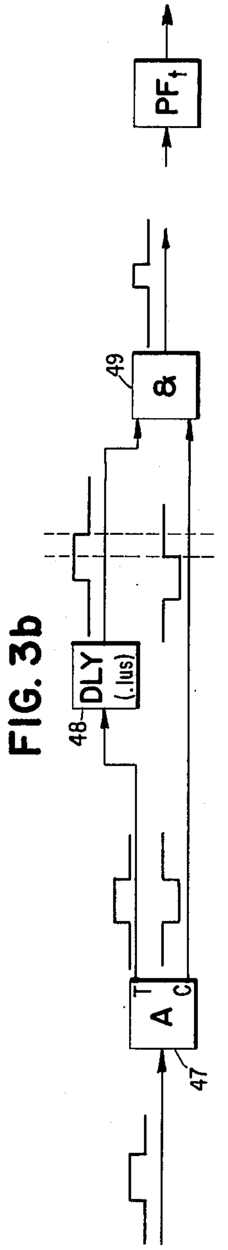
Figure 5:
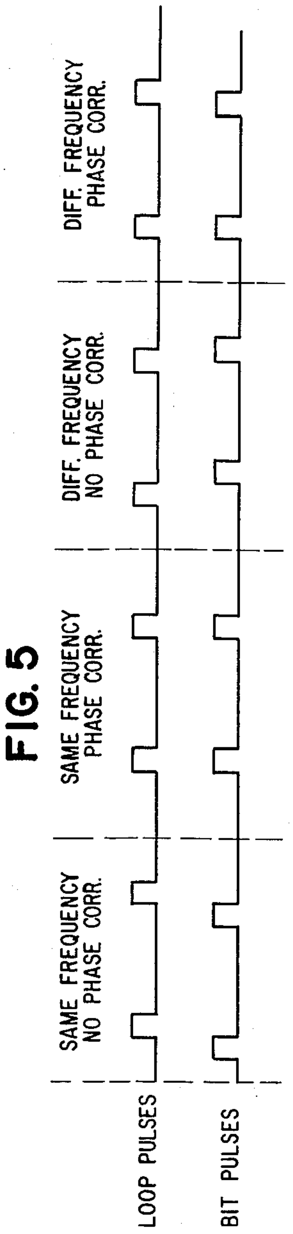
Figure 4:
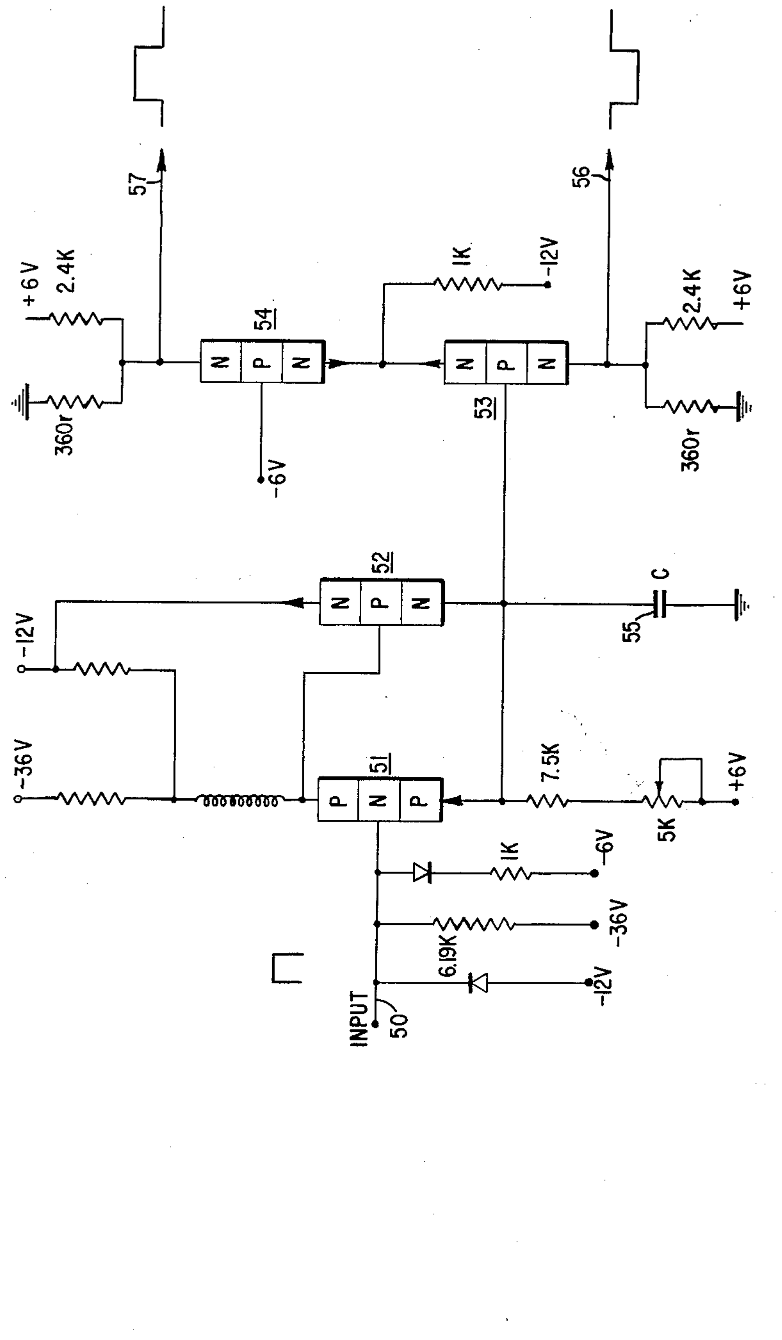
Figure 6A:
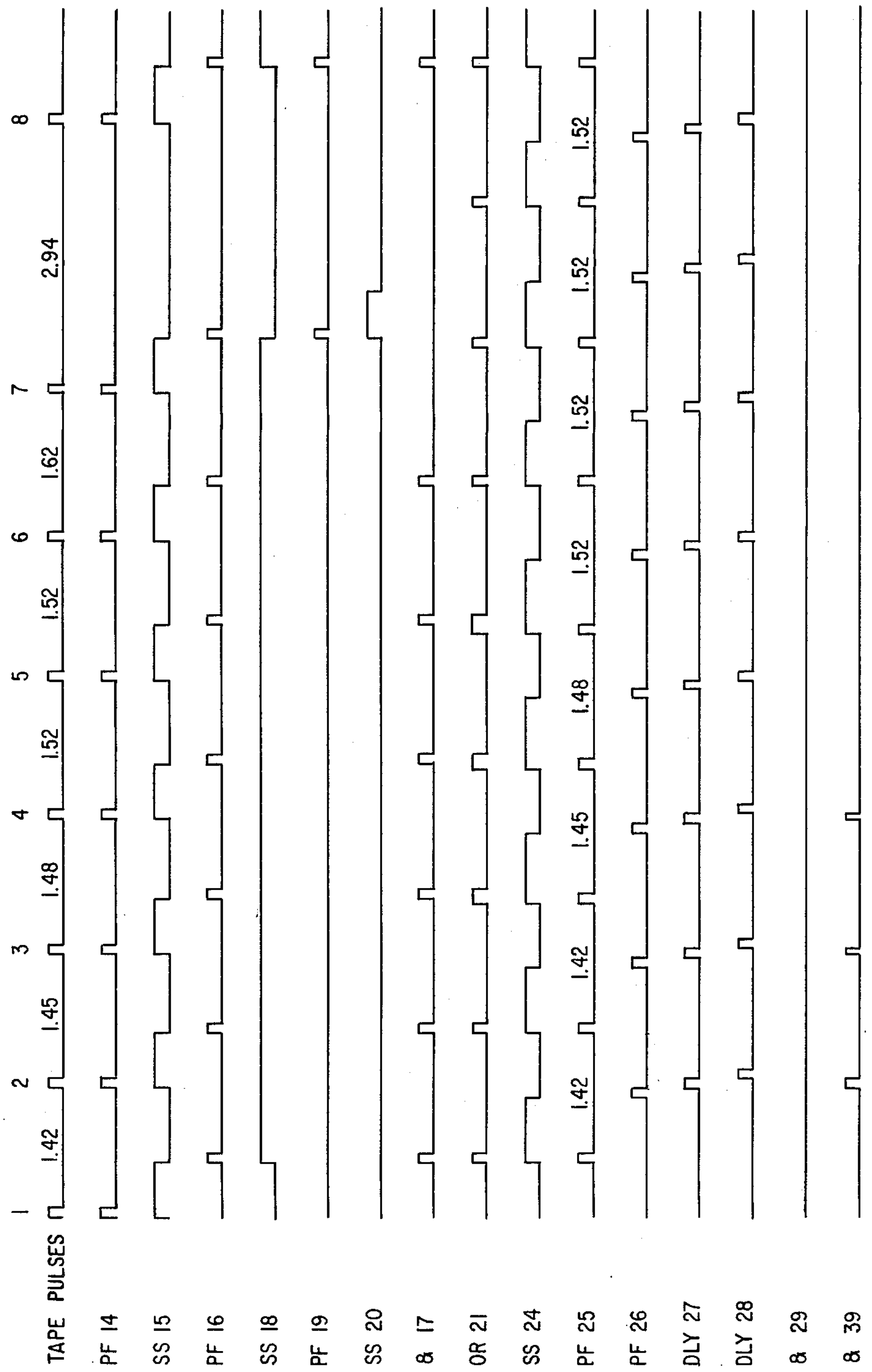
Figure 6B:
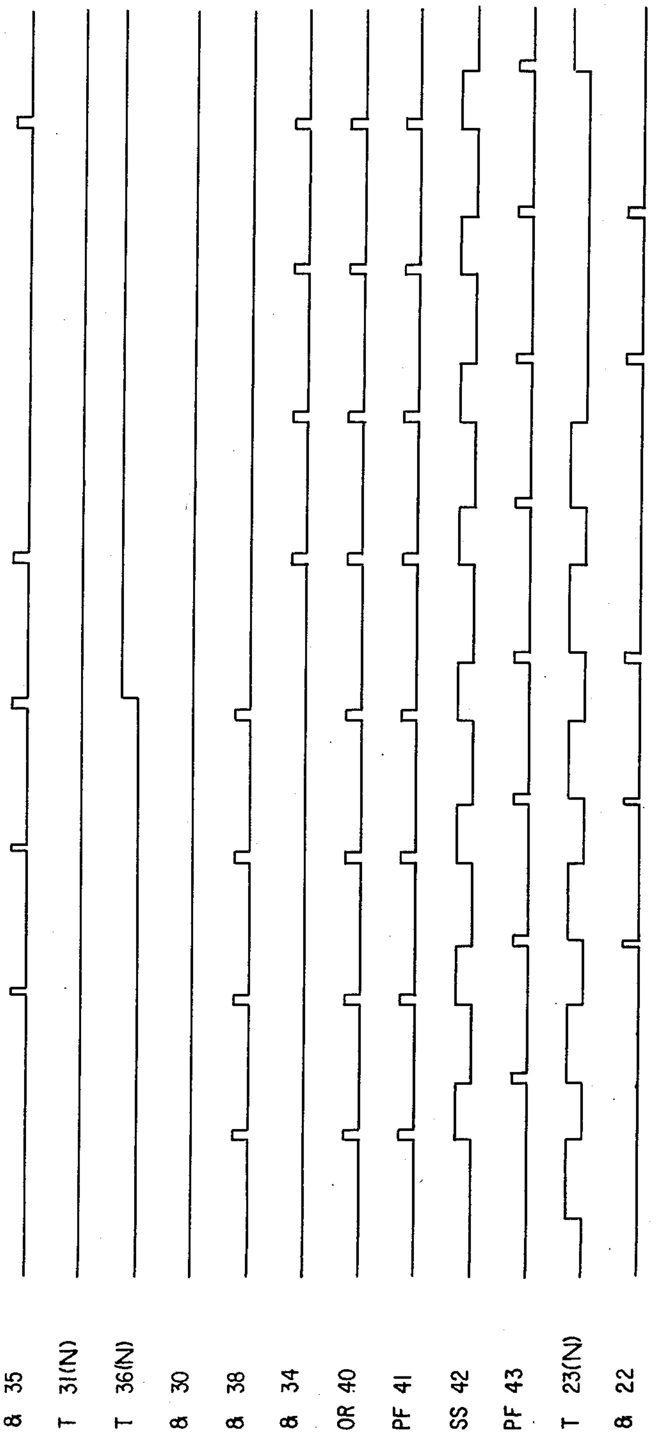

FIGURES 3*a* and 3*b* show various pulse forming circuits used in the frequency shifting clock logic of FIGURE 2;

FIGURE 4 discloses a holdover single-shot generator used in the frequency shifting clock system of FIGURE 2;

FIGURE 5 is a timing diagram used in explaining the over-all operation of the invention; and FIGURES 6*a* and 6*b* comprise a timing diagram showing the function of each logical unit in the invention.

Figure 1:
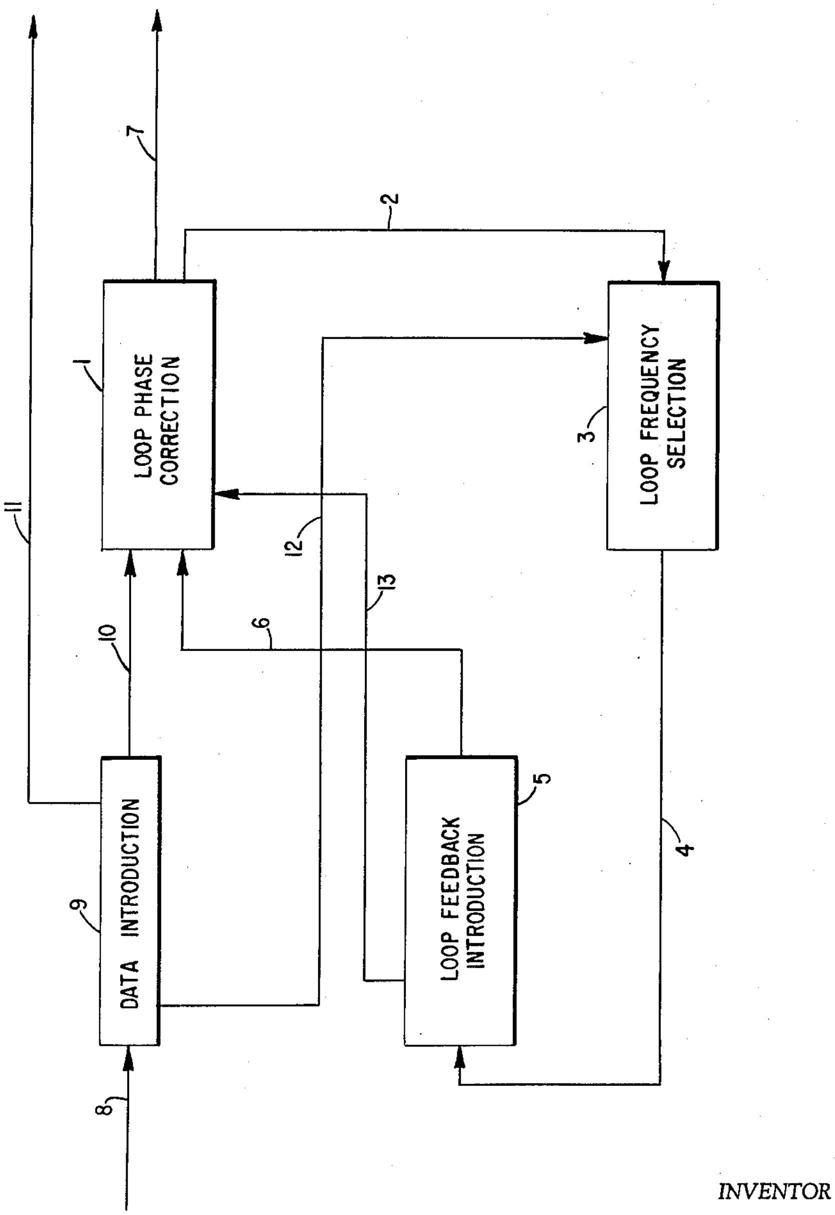
FIGURE 1 shows a generalized block diagram of the frequency shifting clock.

Referring first to FIGURE 1, a recirculating clock pulse loop circuit is disclosed as being comprised of the loop phase correction unit 1, lead 2, loop frequency selection unit 3, lead 4, loop feedback introduction unit 5, and lead 6. A single pulse introduced into this recirculating loop will thereupon continuously and cyclically traverse the loop path in a finite time dependent upon the delays encountered in the loop phase correction unit 1 and loop frequency selection unit 3. Loop frequency selection unit 3 comprises a plurality of delay means which may be selectively connected together so as to vary the loop recirculation time in discrete steps. In the embodiment disclosed herein, these discrete steps are three in number so as to adjust the loop frequency to correspond to the nominal, worst case high, and worst case low frequencies within which the data bit pulse may be expected to fall. The nominal period is taken to be 1.42 microseconds, while the other two periods are 1.32 microseconds and 1.52 microseconds, respectively, for the worst case high and worst case low frequencies. The frequency selection unit 3 also contains a comparing circuit for determining which of these three fixed loop frequencies is closer to the data bit rate frequency from the varying source, so as to allow connection of the appropriate delay means. Loop phase correction unit 1 comprises means for varying the loop recirculation time in linear fashion. Thus, the recirculating clock pulse loop comprises two different means for changing its length so as to effect the time that a pulse requires in traversing the complete loop path. A clock pulse output from the loop is obtained at lead 7 during each bit time which is used to clock the incoming data information signal from a varying rate source.

In FIGURE 1, the binary bit pulses of this data signal from the varying rate source are introduced at lead 8 for insertion into the data introduction unit 9. In the embodiment as disclosed, the data bit appearing on lead 8 may represent binary "1" information in the well known manner, while an absence of a bit pulse during a bit time indicates the presence of binary "0" information. The data introduction unit 9 processes the bit pulses in a manner hereinafter described, and supplies these bit pulses at three different outputs. On lead 11, the bit pulses are supplied to circuitry not shown for purposes of being gated by the clock pulses appearing on lead 7 into any form of utilization circuitry, such as a buffer register. The bit pulses are also generated on lead 10 for introduction into the loop phase correction circuitry 1 in order to vary the loop pulse recirculation time in a manner hereinafter to be described. Furthermore, the bit pulses are also sent via lead 12 to the loop frequency selection unit 3 for use in varying the loop recirculation time in discrete steps which will subsequently be described.

FIGURE 2 discloses the actual construction of the frequency shifting clock by showing the interconnection of a number of small logical units. The individual logic units are grouped together in several dotted blocks which are numbered, together with their input and output leads, to correspond with the block diagram of FIGURE 1.

Referring first to the details of data introduction block 9, data bit positive pulses are introduced at lead 8 to the input of a pulse former (hereinafter referred to as $PF_L$) 14. The subscript L indicates that a pulse former, the details of which are shown in FIGURE 3*a*, is responsive to the leading edge of the positive input pulse thereto so as to generate a 0.1 microsecond positive pulse at its output regardless of the width of its input pulse. The pulse output from $PF_L$ 14 is conducted via lead 12 to frequency selection block 3 subsequently to be described. The output from $PF_L$ 14 is also connected to set a single shot (hereinafter referred to as SS) 15 into its unstable state whereupon it immediately begins to time out according to the value of its time constant network. Since the nominal interval is taken to be 1.42 microseconds in the preferred embodiment, and since the worst case high interval is 1.52 microseconds while the worst case low interval is 1.32 microseconds, SS 15 is adjusted so that it remains 0.62 microsecond in its unstable state for reasons subsequently to be described. The output from SS 15 is directed to $PF_t$ 16 whose subscript *t* indicates it to be a pulse former adapted to supply a 0.1 microsecond positive output pulse upon detection of the trailing edge of a positive input pulse thereto. Therefore, upon SS 15 returning to its stable state, thus terminating its output pulse, $PF_t$ 16 responds and generates an output pulse. This 0.1 microsecond pulse appears on output lead 11 which is directed to sampling gates not shown where the data bit pulses are gated by the clock pulses appearing on lead 7 of FIGURE 2.

In block 9, the output from $PF_t$ 16 is also connected to one input of AND gate 17 and to SS 18. The other input to AND gate 17 is derived from SS 20 which generates a positive output in its stable state in order to allow the bit pulse from $PF_t$ 16 to be gated through AND circuit 17. At the same time that the pulse from $PF_t$ 16 is applied to AND gate 17, the leading edge of this pulse triggers SS 18 to its unstable state in which it remains for a period of at least 1.6 microseconds. The output from SS 18 is fed to $PF_t$ 19 which only responds to the trailing edge (which occurs if and when SS 18 returns to its stable state) in order to generate a 0.1 microsecond positive output pulse to SS 20. Upon receipt of the leading edge of this pulse from $PF_t$ 19, SS 20 is triggered to its unstable state for a period of 0.5 microsecond, during which time no pulse from $PF_t$ 16 can be gated through AND gate 17. However, a bit pulse which arrives at an interval of less than 1.6 microseconds behind an immediately preceding bit pulse will maintain SS 18 in its unstable condition and thus prevent SS 20 from being set to its unstable state which would block AND gate 17. Furthermore, if a binary "0" bit occurs during a bit time, which is denoted by the absence of a bit pulse within the bit time interval, then SS 20 will have timed out and returned to its stable state so as to unblock AND gate 17 by the time that another bit pulse arrives. Only those bit pulses which arrive at an interval greater than 1.6 microseconds but less than 2.1 microseconds after a preceding pulse will be blocked due to the unstable condition of SS 20. The output of AND circuit 17 is directed via line 10 to the loop phase correction block 1.

Referring now to block 1, lead 10 from block 9 is connected to one input of OR circuit 21 and supplies data bit pulses thereto. The other input of OR circuit 21 is connected to AND gate 22. One input to AND gate 22 is obtained from lead 6 which supplies loop pulses from the loop feedback introduction block 5. The other input to AND gate 22 is derived from a bistable trigger (hereinafter referred to as T) 23 within block 1 which must be in its Off condition in order that AND gate 22 might pass loop pulses from lead 6. T23 in turn is switched to its On condition by each bit pulse appearing on lead 10, and is subsequently turned Off by a loop pulse on lead 13. Thus, if a bit pulse appears on lead 10 before or simultaneously with a loop pulse appearing on lead 6, AND gate 22 will not pass the loop pulse due to T23 having been set to its On state by the bit pulse. In such a case, only the bit pulse is directed through OR gate 21. However, if the bit pulse at lead 10 occurs after the loop pulse at lead 6, then the loop pulse will pass through AND gate 22 until the bit pulse arrives, if it does at all. It should be noted that in the event that the bit pulse arrives later than the loop pulse but still overlaps a certain portion of the loop pulse, then T23 will allow that portion of the loop pulse, which does not overlap the bit pulse, to pass through AND gate 22. T23, when set On, is never reset to its Off condition until after a loop pulse on lead 6 disappears.

The output from OR gate 21 is connected to $SS_h$ 24 which is of the hold-over variety indicated by the subscript *h*. $SS_h$ 24 differs from SS 15 and SS 18 in that when set to its unstable state by the leading edge of positive input pulse, it does not begin to time out until the input pulse has completely disappeared. $SS_h$ 24 is adjusted in the present embodiment to have a time out period of 0.6 microsecond, but this time should be counted from the trailing edge of an input pulse rather than the leading edge. The output from $SS_h$ 24 is connected to $PF_L$ 25 which generates a 0.1 microsecond output clock pulse upon detection of the leading edge of its input from $SS_h$ 24. Thus, $PF_L$ 25 effectively responds to the leading edge of the output pulse from OR gate 21 which triggers $SS_h$ 24 into its unstable state. As before mentioned, the pulse formers in the invention will emit only a 0.1 microsecond pulse no matter what the period of the input pulse thereto. The output clock pulses from $PF_L$ 25 are directed to lead 7 and are then used to gate data bit pulses appearing on lead 11 to various utilization circuitry, such as buffer registers or the like.

The output from $SS_h$ 24 is also connected to $PF_t$ 26 which responds only to the trailing edge of the output from $SS_h$ 24 and generates a 0.1 microsecond pulse on lead 2 which is connected to block 3. This occurs when $SS_h$ 24 times out and returns to its stable state. Therefore, $PF_t$ 26 effectively is responsive to the trailing edge of the output pulse from OR gate 21 with this trailing edge being delayed 0.6 microsecond by $SS_h$ 24. Furthermore, it should be noted that the trailing edge of the output from OR gate 21 is always the trailing edge of the data bit pulse if such has been introduced on lead 10 to OR gate 21. This is so since if the bit pulse arrives earlier than or simultaneously with the loop pulse at lead 6, then the loop pulse cannot be gated through AND gate 22 so as to influence the output pulse from OR gate 21. Furthermore, if the bit pulse arrives later than the loop pulse at OR gate 21, then obviously the trailing edge of the bit pulse becomes the trailing edge of the output pulse from OR gate 21. Thus, phase comparison block 1 compares the loop pulse entering on lead 6 and the data bit pulse entering on lead 10 so as to effectively shift this loop pulse, now appearing on lead 2, into phase correspondence with the bit pulse. Block 1 also delays the loop pulse by an amount equal to the time out period of $SS_h$ 24 plus 0.1 microsecond, since $SS_h$ 24 begins to time out on the trailing edge of its input pulse.

Another way of considering the function of block 1 is to say that it effectively changes the loop recirculation time, since the loop pulse may be advanced or delayed in time by an amount equal to the overlap between it and a bit pulse. Because this overlap may be any amount within a specific range of 0 to 0.1 microsecond in practice, the loop recirculation time is varied in linear fashion. It should also be appreciated that in the absence of a bit pulse on lead 10, which generally indicates binary "0" information, no phase shifting is performed in block 1 on the loop pulse appearing on lead 6, which then is merely delayed by $SS_h$ 24 and re-introduced to the loop circuit on lead 2.

Referring now to the loop frequency selection block 3, the loop pulse, which may have been phase shifted in accordance with a bit pulse as previously described, is introduced to delay (hereinafter referred to as DLY) 27 which delays this pulse 0.1 microsecond. The output of DLY 27 is fed to DLY 28 which is also 0.1 microsecond in length. Thus, the loop pulses appearing successively on lead 2, at the output of DLY 27, and at the output of DLY 28, are spaced apart 0.1 microsecond. The pulse appearing on lead 2 is also fed to one input of AND gate 29 and AND gate 30. The other input of AND gate 30 is derived from the positive On output of T31 which must be in its On condition in order to allow AND gate 30 to pass the pulse appearing at lead 2. T31 is turned On by a signal appearing at its On input which is built up by pulses arriving from AND gate 29. An output pulse from AND gate 29 is generated with the simultaneous presence of pulses at all three of its inputs. As before mentioned, one input to AND gate 29 is derived from lead 2. Another input is derived from lead 12 which originates from $PF_L$ 14 in block 9. Thus, lead 12 conveys each bit pulse to AND gate 29. The third input to AND gate 29 is derived from the Off output of T36, which is positive only when T36 is Off.

In like fashion, the output from DLY 28 is directed to AND gate 34 and AND gate 35. For AND gate 34 to gate through the loop pulse appearing from DLY 28, T36 must be in its On condition so as to raise the other input of AND gate 34 which is connected to its On output. T36 is set in its On condition by a signal derived from output pulses appearing from AND gate 35, which in turn requires the simultaneous presence of pulses at all three of its inputs. As with AND gate 29, one of these inputs is derived from lead 12 on which appears each data bit pulse. The third input to AND gate 35 is derived from the Off output of T31. The loop pulse from DLY 27 is fed to both AND gates 38 and 39. In order to pass this loop pulse, however, AND gate 38 further requires that both T31 and T36 be Off so that the other two inputs thereto will be raised. AND gate 39 has but two inputs thereto, the other of which is the bit pulse applied on lead 12 from $PF_L$ 14. The output from AND gate 39 is directed to both Off inputs of T31 and T36 in order to place them in their Off conditions when a pulse appears therefrom. The outputs from AND circuits 30, 34, and 38 are in turn directed to OR gate 40 which mixes the signals appearing at its inputs to provide an output loop pulse on lead 4 to the loop feedback introduction unit 5.

The input circuits of T31 and T36 are designed, by well known methods, to respond to the following conditions. In order to set either trigger to its Off condition, a pulse from AND gate 39 should preferably have a minimum width of 0.05 microsecond for reasons subsequently to be given. However, in order to set either trigger to its On condition, more than one pulse of the above minimum width from its respective AND gate 29 or 35 is required. Capacitors 32 and 37 are respectively coupled to the On inputs of T31 and T36 so as to integrate the pulses appearing thereon in order to build up a voltage level sufficient to set the triggers. The number of pulses needed to set a trigger to its On condition may be varied to suit the requirements of the environment in which the invention finds itself. Furthermore, the leakage factor of the integrating circuits should be such that the required number of pulses must appear without undue intervals between them in order that the triggering voltage level can be obtained.

The function of capacitors 32 and 37 is to shift the clock frequency from its nominal value to either the worst case high or worst case low value only when the general trend of the data bit rate is definitely established as being closer to one of these two latter frequencies. Thus, the triggering of T31 or T36 due to sporadic and freakish bit pulse intervals is prevented.

It should be noted in connection with block 3 that the recirculation loop pulse which is introduced at lead 2 may pass either directly through AND gate 30 to output lead 4, or it may be selectively directed through either AND gate 38 or AND gate 34. Therefore, the interval between the loop pulse on lead 2 and its appearance at lead 4 may either be 0, 0.1 microsecond, or 0.2 microsecond long, depending upon which of the three AND gates 30, 38, or 34 is conditioned to pass the pulse. In this manner, the recirculation time of the loop is varied in discrete steps of 0.1 microsecond, which, when combined with the other fixed delays of the loop, allow a total loop recirculation time of 1.32 microseconds, 1.52 microseconds, or a nominal value of 1.42 microseconds. The complete loop timing will be better understood after reference to the structure of the loop feedback introduction block 5 next to be considered. AND gates 29, 39, and 35, together with capacitors 32 and 37, comprise a comparing circuit for determining which of the three above-mentioned discrete loop frequencies is closest to the bit rate frequency from the varying rate source.

Loop pulses appearing on lead 4 are applied to $PF_L$ 41 which is responsive to the leading edge of its input signal and generates a 0.1 microsecond output pulse. The output of $PF_L$ 41 is applied via lead 13 to the Off input of T23. This output pulse from $PF_L$ 41 is also applied to SS 42 which, upon detection of the leading edge of this pulse, triggers to its unstable state and immediately begins to time out so that at the end of a 0.62 microsecond period, it reverts to its stable state. The output signal from SS 42, which is positive during time out, is directed to $PF_t$ 43 which in turn is responsive to the trailing edge of the output pulse from SS 42 in order to generate a 0.1 microsecond pulse. Therefore, the interval between the pulse introduced at lead 4 and the pulse appearing from the output of $PF_t$ 43 is 0.62 microsecond. The pulse appearing at the output of $PF_t$ 43 is applied to lead 6 which is connected to one input of AND gate 22 in block 1 which has previously been described.

In order to appreciate the distinction between the phase correction circuit 1 and the frequency selection circuit 3, reference should be made to FIGURE 5. As there shown, the total recirculation time of the loop may be the same as the interval between the data bit pulses, however, the loop pulse may not be in phase. Therefore, no realistic comparison of the loop pulse frequency and the bit pulse frequency can be made until at least one loop pulse and bit pulse are phased so as to be coincident. The phase correction circuit 1 performs this initial task by effectively changing the loop recirculation time in linear fashion in accordance with each bit pulse, so that the loop pulse is exactly coincident with the bit pulse. The frequency selection circuitry 3 then compares the phase corrected loop pulse with the next following bit pulse in order to determine which of the three discrete loop intervals is closest to the interval between the two bit pulses.

Once a pulse has been introduced into the recirculating loop, it will traverse the following route. From $PF_t$ 26 it will be directed to one of the three AND gates 38, 33, or 34 depending upon the states of T31 and T36. While traveling through block 3, the loop pulse may thus incur a delay of 0, 0.1, or 0.2 microsecond. After incurring another delay of 0.62 microsecond through SS 42, the loop pulse will again be applied to AND circuit 22. The delay incurred by the loop pulse in phase correction block 1 depends upon the phase relation between it and a bit pulse, if any.

If a data bit pulse is assumed to be absent from lead 10 at this time, or if it is exactly coincident with the loop pulse, then the loop pulse will pass through OR gate 21 without any change in phase. If it is further assumed that at this time only AND gate 38 is conditioned, then the total recirculation time of the loop is the sum of $SS_h$ 24 plus DLY 27 plus SS 42. Furthermore, since $SS_h$ 24 is effective only at the trailing edge of the output from OR gate 21, then another 0.1 microsecond must always be added to the loop time since DLY 27 and SS 42 are both responsive to the leading edges of their input pulses. The sum of these four values is 1.42 microseconds which is the nominal interval between bit pulses in the present embodiment. Conversely, if either AND gate 30 or AND gate 34 were conditioned to pass the loop pulse, then the total recirculating loop time would be either 1.32 microseconds, or 1.52 microseconds, respectively. This is again assuming that there has been no bit pulse present on lead 10 when a pulse has been recirculating within the loop.

Upon the appearance of a bit pulse on lead 8, its output from $PF_L$ 14 will normally occur at a time so as to exactly coincide with or overlap one of the pulses from the outputs of $PF_t$ 26, DLY 27, and DLY 28. One or more of the AND gates 29, 39, and 35 will have outputs during any time that signals appear simultaneously on all of their inputs. A pulse of proper width passing through AND gate 39 will trigger T31 and T36 to their Off positions so as to condition only AND gate 38 for passage of a loop pulse therethrough, thus effecting a loop recirculation time equivalent to the value of the nominal interval between bit pulses. Furthermore, the bit pulse appearing at the output $PF_L$ 14, which accomplishes the selection of the loop length in block 3, also is delayed 0.62 microsecond by SS 15. Furthermore, the output from the frequency selection block 3 is also delayed 0.62 microsecond by SS 42. Therefore, the delayed bit pulse appearing at the output of AND gate 17 is compared in block 1 with the delayed loop pulse appearing at the output of $PF_t$ 43. Because of the actions of T23, AND gate 22, OR gate 21, $SS_h$ 24, and $PF_t$ 26, the loop pulse appearing on lead 6 is effectively shifted either forward in time or backward in time so that it coincides with the bit pulse. Since the overlap between the loop pulse at lead 6 and the bit pulse at lead 10 may be any magnitude between 0 and 0.1 microsecond, the phase correction block 1 effectively changes the timing of the loop in linear fashion, as opposed to the effect of block 3 which changes the loop timing in three discrete steps. Since the frequency clock is designed to follow the average change of bit pulse frequency, rather than the instantaneous change, the phase correction circuit 1 also provides for a correspondence between the clock pulse at lead 7 and a bit pulse at lead 11 until one of the integrating circuits associated with T31 and T36 decides that the trend of the bit pulse frequency is such as to warrant a change within loop frequency selection block 3. When this occurs, then the phase correction circuitry 1 will not need to perform as great a phase correction, if it now performs any at all, as it did before the discrete time of the loop was changed.

Referring now to FIGURE 3*a*, the details of a pulse former which is responsive to the leading edge of a positive input pulse is shown. A positive input pulse of any width is applied to the input of an amplifier 44 which provides both the true and inverted (or complement) output of the input pulse. The true output of amplifier 44 is directed to one input of AND gate 46, while the complement output of amplifier 44 is directed through a 0.1 microsecond DLY 45 to the other input of AND gate 46. In order to provide an output, AND gate 46 must have signals appearing simultaneously on both of its inputs. In the absence of a pulse to the input of amplifier 44, its true output is down and its complement output is up, thereby preventing an output signal from AND gate 46. When a positive pulse is applied to amplifier 44, the true output is up and the complement output is down. However, the up complement signal does not disappear from the input to AND gate 46 until 0.1 microsecond after the input is first applied to amplifier 44. Therefore, a signal appears at both inputs of AND gate 46 for 0.1 microsecond after the beginning of the leading edge of the input signal to amplifier 44. This provides a 0.1 microsecond output from AND gate 46 whose leading edge is coincident with the leading edge of the pulse input to amplifier 44.

Referring now to FIGURE 3*b*, the details of a pulse former responsive to the trailing edge of an input pulse are shown. An amplifier 47 receives the positive input pulse and provides both a true and complement output as in FIGURE 3*a*. The complement output of amplifier 47 is directly connected to AND gate 49, while the true output of amplifier 47 is directed through a 0.1 microsecond DLY 48 to the other input of AND gate 49. Upon occurrence of a positive input to amplifier 47, the complement output thereof immediately goes down. When the input signal to 47 disappears, the complement output also immediately rises. The disappearance of the up signal from the true output to AND gate 49 is delayed 0.1 microsecond because of DLY 48. Therefore, an overlap occurs between the two up inputs to AND gate 49 so as to produce a 0.1 microsecond output signal whose leading edge coincides with the trailing edge of the input signal to amplifier 47.

The circuit details of a typical single shot holdover circuit are shown in FIGURE 4. This circuit may be used for the $SS_h$ 24 unit shown in the previous figures. In FIGURE 4, a transistor 51 acts as a switch for allowing capacitor 55 to charge and discharge. Capacitor 55, when charged, is allowed to discharge primarily through transistor 52. Transistors 53 and 54 comprise phase inverting circuits for obtaining the outputs shown therefrom. In its stable condition, the absence of an input pulse at terminal 50 holds the base of transistor 51 to a −12 volt potential and thus allows PNP transistor 51 to conduct rather heavily. The conduction of transistor 51 raises the potential at its collector lead so as to allow NPN transistor 52 to also conduct. The emitter of transistor 51 is therefore close to ground so that little or no voltage exists across capacitor 55. Furthermore, the potential of the base of NPN transistor 53 is quite close to the potential of its emitter so that little or no conduction occurs therethrough. NPN transistor 54 conducts rather heavily. This causes conduction through the collector resistances of transistor 54 and so results in a "down" signal appearing at output terminal 57.

Upon receipt of an input pulse at terminal 50, transistors 51 and 52 are both tuned off or nearly so. This raises the potential at the emitter of transistor 51 and thus allows capacitor 55 to charge. Furthermore, transistor 53 is rendered more heavily conducting since its base now becomes sufficiently positive with respect to its emitter. Therefore, current flow is heavy through the collector resistances of transistor 53 so that the signal appearing at terminal 56 drops. Conversely, the heavy current flow through transistor 53 increases the potential at its emitter so as to effectively shut off or reduce current flow through transistor 54, and thus raise the output signal appearing at terminal 57. The leading edges of the signals appearing at terminals 56 and 57 are practically concurrent in time with the leading edge of the signal appearing at terminal 50. When the input pulse ends at terminal 50, transistors 51 and 52 are again rendered conducting. Capacitor 55 discharges primarily through transistor 52, and its discharge time is considered to be the "time out" period of the circuit. This, of course, does not begin to occur until after the pulse at terminal 50 disappears. As long as capacitor 55 retains a substantial amount of its charge, then transistor 53 remains conducting, thus keeping transistor 54 nonconducting. The output signals at terminals 56 and 57 therefore do not revert to their stable condition potentials until after capacitor 55 substantially discharges.

In order to fully understand the operation of the invention, the sequence chart of FIGURE 6 should be examined. Assuming initially that no pulse is recirculating about the loop, the first data bit pulse applied to lead 8 will cause $PF_L$ 14 to emit a 0.1 microsecond pulse. SS 15 is triggered to its unstable state by the leading edge of the output pulse from $PF_L$ 14 and remains in this condition for 0.62 microsecond, whereupon it returns to its stable state and the trailing edge of its output pulse is produced. Since $PF_t$ 16 is responsive to the trailing edge of its input pulse, it thereupon produces a 0.1 microsecond output pulse which triggers SS 18 to its unstable state for a period of 1.6 microseconds measured from the leading edge of its input pulse. Furthermore, it is assumed that SS 20 is initially in its stable state so as to condition AND gate 17 to pass the first bit pulse appearing from $PF_t$ 16. The output from AND gate 17 is supplied to OR gate 21 and to T23. Since no pulse is circulating within the loop, the output of OR gate 21 faithfully reflects the bit pulse applied to it by AND gate 17. This bit pulse now becomes the loop pulse. $SS_h$ 24 is triggered to its unstable state by the leading edge of the output from OR gate 21 but does not begin to time out until receipt of the trailing edge of this pulse. Therefore, in FIGURE 6 it is seen that in this instance $SS_h$ 24 remains in its unstable state for 0.7 microsecond since the width of the output pulse from OR gate 21 is 0.1 microsecond.

$PF_L$ 25 is responsive to the leading edge of the output pulse from $SS_h$ 24 and so provides a 0.1 microsecond clock pulse. As can be seen from FIGURE 6, the clock pulse appearing from $PF_L$ 25 is exactly coincident with the data bit pulse appearing from $PF_t$ 16, since the movement of the bit pulse from $PF_t$ 16 through AND gate 17 and OR gate 21 is essentially without delay. Therefore, the bit pulse at lead 11 may be gated through circuitry not shown by the clock pulse appearing at lead 7 to various utilization circuitry not shown. However, $PF_t$ 26 is responsive only to the trailing edge of the pulse from $SS_h$ 24 and so generates an output loop pulse spaced an interval of 0.7 microsecond from the pulse appearing at $PF_L$ 25. This loop pulse necessarily appears at the output of DLY 27 and DLY 28 at spaced intervals of 0.1 microsecond, and immediately begins to pass through whichever of the AND gates 30, 38, or 34 happens to be conditioned at this time. For purposes of this discussion, AND gate 38 is so selected and thus T31 and T36 are both Off. Therefore, the pulse from DLY 27 is gated to the output of OR gate 40 after a 0.1 microsecond delay in block 3.

Assume also that during the next following bit time, another bit pulse from the varying rate source appears on lead 8. If this bit pulse is spaced 1.42 microseconds away from the first bit pulse, then its appearance at the output of $PF_L$ 14 is exactly coincident with the loop pulse appearing at the output of DLY 27 which is passing through AND gate 38. AND gate 39 is thereupon conditioned to also pass the complete pulse from DLY 27 so as to maintain T31 and T36 in their Off positions. Therefore, block 3 has determined that the recirculation time of the loop equals the interval between the first two data bit pulses so that no change in the discrete loop frequency need be made.

Upon detection of the leading edge of the loop pulse from OR gate 40, $PF_L$ 41 generates a 0.1 microsecond pulse which in turn sets T23 to its Off condition and also triggers SS 42 to its unstable state in which it remains for 0.62 microsecond. Thereafter, $PF_t$ 43 generates a 0.1 microsecond pulse upon detection of the trailing edge from SS 42 which is applied to AND gate 22. In the meantime, the second bit pulse has also been delayed 0.62 microsecond by SS 15 and is now applied to AND gate 17 and SS 18. Since it arrives at SS 18 at an interval of 1.42 microseconds after the first bit pulse, it prevents SS 18 from reverting to its stable state so that SS 20 cannot be set to its unstable condition. This second bit pulse thereupon passes through AND gate 17 and arrives at OR gate 21 at exactly the same time that the loop pulse arrives at AND gate 22. The appearance of the bit pulse on lead 10 triggers T23 to its On condition and thus prevents AND gate 22 from passing this loop pulse. OR gate 21 therefore passes only the second bit pulse, although if the loop pulse from $PF_t$ 43 were present at its other input, the output of OR gate 21 would not be affected since both input pulses would be exactly coincident in time. Therefore, the second bit pulse becomes the loop pulse and no phase correction is necessary.

Upon detection of the leading edge of the pulse from OR gate 21, $SS_h$ 24 is triggered but does not begin to time out until the trailing edge of its input pulse appears. The second clock pulse appearing from $PF_L$ 25 is therefore again exactly coincident with the second bit pulse appearing at the output of $PF_t$ 16. Furthermore, the loop pulse now appearing at the output of DLY 27 is again spaced an interval of 1.42 microseconds from the previous appearance of the second bit pulse at the output of $PF_L$ 14, and is again gated through AND gate 38. However, the third bit pulse arrives at an interval of 1.45 microseconds from this second bit pulse. Therefore, its appearance on lead 12 overlaps each of the two pulses appearing from DLY 27 and DLY 28. This indicates that the frequency of the bit pulses now arriving falls between the nominal frequency and the worst case low frequency. In such case, AND gate 39 first passes a 0.07 microsecond pulse, while AND gate 35 thereafter passes a 0.03 microsecond pulse. The small pulse supplied to the On input of T36 is not sufficient to set it to its On state, but does initiate the building up of a charge on capacitor 37 which may eventually result setting T36. Therefore, although the frequency of the bit pulses is apparently beginning to decrease, which results in a longer period, the frequency selection circuit does not yet change the loop frequency by a 0.1 microsecond step.

The loop pulse is again delayed 0.62 microsecond by SS 42 and so returns to block 1 for phase comparison purposes with the third bit pulse which also is delayed 0.62 microsecond by SS 15 after it had been sent to block 3. Since the loop recirculation time still remains at 1.42 microseconds, however, the loop pulse derived from $PF_t$ 43 now appears at AND gate 22 0.03 microsecond before the third bit pulse appears at AND gate 17. Thereupon, a portion of the loop pulse on lead 6 is gated through AND gate 22 before T23 is switched to its On condition by the subsequent arrival of the third bit pulse on lead 10. The leading edge of the output pulse from OR gate 21 therefore corresponds to the leading edge of the loop pulse appearing on lead 6, while the trailing edge of the output pulse from OR gate 21 corresponds to the trailing edge of the third bit pulse on lead 10. Since $PF_L$ 25 is responsive to the leading edge of the output pulse from OR gate 21 via SS 24, the third clock pulse appearing on lead 7 is 1.42 microseconds removed from the preceding second pulse as shown in FIGURE 6. However, this third clock pulse is approximately 0.03 microsecond ahead of the third bit pulse now appearing on lead 11. It is still sufficiently timed with that bit pulse, however, so as to correctly gate it through to the utilization circuitry. However, since $PF_t$ 26 is responsive to the trailing edge of the output from $SS_h$ 24, which corresponds to the trailing edge of the third bit pulse, the loop pulse now introduced to the block 3 is now shifted in phase so as to effectively coincide with the third bit pulse, so that it can be compared against the fourth bit pulse.

The operation of the frequency clock continues as illustrated in FIGURE 6 and further detailed description is therefore deemed unnecessary. It should be noted, however, that the intervals between the bit pulses gradually increase toward the worst case high interval of 1.52 microseconds so that eventually the potential across capacitor 37 associated with the On input lead of T36 rises sufficiently to switch that trigger to its On condition. In so doing, AND gate 38 is de-conditioned and AND gate 34 becomes conditioned to thereupon pass only pulses from DLY 28, thus changing the recirculation time of the loop to 1.52 microseconds. As long as the interval between the succeeding bit pulses remains closer to 1.52 microseconds than to 1.42 microseconds, T36 will remain in its On condition. However, the phase correction unit 1 will vary the loop recirculation time in a linear fashion so as to maintain the clock pulse output at lead 7 in approximate coincidence with any bit pulses at lead 11. Upon a bit pulse interval becoming closer to 1.42 microseconds, AND gate 39 will generate a sufficiently wide enough pulse so as to set T36 into its Off condition and thus enable AND gate 38 to again pass pulses from DLY 27. A similar action occurs when the interval decreases from the nominal value to the worst case of 1.32 microseconds.

It is not expected that two successive bit intervals will be as far apart as 1.32 microseconds and 1.52 microseconds, since the frequency of the typical scanning means normally does not change at such a high rate. In order to insure that the clock does not change its discrete recirculation time more than 0.1 microsecond between any two successive bit intervals, AND gates 29 and 35 are respectively de-conditioned if either T36 or T31 is in its On condition. Thus, no charge can be added to capacitors 32 or 37 unless the discrete loop interval is 1.42 microseconds.

It should be appreciated that upon T23 being set to its On condition, it will always be reset to its Off condition before another bit pulse can possibly appear at the output of AND gate 17. This is accomplished by a connection from $PF_L$ 41 to the Off input of T23. Furthermore, it should be noted that whenever a binary "0" information bit is encountered in the data, then an input pulse may not appear on lead 8. This condition, however, does not inhibit the recirculation of a pulse through the loop, since once a pulse is initially introduced into the loop, it will always appear at the outputs of $PF_t$ 26, DLY 27, and DLY 28, and from there will be gated through one of the AND gates 30, 38, or 34 so as to maintain the discrete loop frequency which has been determined by the last setting of T31 and T36. Therefore, clock pulses will continue to appear on lead 7 so as to identify the bit time interval in order that the utilization circuitry can recognize the absence of a pulse from the data source. The discrete frequency of the loop is determined by the last few bit pulses received by the clock.

A bit pulse arriving at an interval of 1.62 microseconds or greater from a bit pulse in the immediately preceding bit time interval will not be gated to the phase correction circuitry because of the action of SS 18, $PF_t$ 19, and SS 20. A bit pulse arriving at so great an interval indicates that the bit rate has fallen without the worst case low frequency range. Phase corrections are not performed since such bit pulses are freakish in nature and should not be allowed to disrupt the average frequency of the clock pulses. This condition is illustrated between bit pulses 6 and 7 in FIGURE 6.

While a particular embodiment of the invention has been shown, it will be understood that the invention is not limited thereto since many modifications may be made, and it is therefore contemplated by the attendant claims to cover any such modifications as fall within the spirit and scope of the invention.

What is claimed is:

1. A frequency shifting clock generator responsive to bit pulses coming from a varying rate source, comprising a pulse producing means, a plurality of delay means, each of which is operative when selectively connected in said pulse producing means to cause the pulse producing means to produce pulses at a different fixed rate, means connected to said pulse producing means for transmitting said pulses, means for determining which of the fixed rates is closest to the rate that the bits are coming from said source, means under control of said determining means for selectively connecting the delay means that causes the pulse producing means to produce pulses at a rate closest to the rate the bits are coming from said source, and a phase correction circuit, said bit pulses being connected to one input to said phase correction circuit, the output of said pulse producing means being connected to a second input to said phase correction circuit, said phase correction circuit delaying the pulse outputs of said pulse producing means to correct the phase difference between said two inputs.

2. A frequency shifting clock generator responsive to bit pulses coming from a varying source which comprises a pulse recirculating loop circuit containing first means responsive to the rate of said bit pulses for varying the pulse recirculation time of said loop circuit in discrete steps and second means responsive to the rate of said bit pulses for varying the pulse recirculation time in linear fashion.

3. A clock generator according to claim 2 which further includes means responsive to a certain interval between said bit pulses for disabling said second means.

4. A clock generator according to claim 2 which further includes means for delaying the response of said first means until a plurality of said bit pulses from said variable rate source have been detected.

5. A frequency shifting clock generator responsive to bit pulses coming from a varying rate source, comprising a phase correction circuit having first and second input terminals and an output terminal, a plurality of delay means, means for connecting said plurality of delay means to said output terminal, means responsive to said bit pulses for selectively connecting said plurality of delay means to said first input terminal so as to form a closed recirculating loop, and means for transmitting said bit pulses to said second input terminal.

6. A clock generator according to claim 5 in which said phase correction circuit includes an OR gate and a holdover single shot generator connected to the output of said OR gate, said first input terminal being connected to one input to said OR gate, said second input terminal being connected to a second input to said OR gate, the output of said single shot generator being connected to said output terminal.

7. A clock generator according to claim 5 in which said plurality of delay means are connected together in a series circuit having its input terminal connected to the output of said phase correction circuit, said series circuit also having tap terminals taken from its input and output terminals and from the connections between said delay means, and said selectively connecting circuit comprises a first set of AND gates with an input of each being connected to a different one of said tap terminals and another input of each being adapted to receive said bit pulses, an OR gate, a second set of AND gates with an input of each being connected to a different one of said tap terminals and the output of each being connected to said OR gate, and means responsive to the output signals of said first AND gate for selectively applying signals to other inputs of said second AND gate set so as to condition only one AND gate in said second set to pass signals from one of said tap terminals.

8. A clock generator according to claim 7 in which said last named means includes a plurality of trigger circuits, the output of each of said first AND gates being connected to an associated one of said trigger circuits to condition said trigger circuit, the output of each of said trigger circuits being connected to an associated one of said second AND gates, a selected one of said second AND gates being conditioned to pass pulses from an associated tapped terminal in accordance with the conditioning of said trigger circuits.

9. A clock generator according to claim 7 in which said phase correction circuit includes an OR gate and a holdover single shot generator connected to the output of said OR gate, said first input terminal being connected to one input to said OR gate, said second input terminal being connected to a second input to said OR gate, the output of said single shot generator being connected to said output terminal.

10. A frequency shifting clock generator responsive to bit pulses coming from a varying rate source, including a first delay means for receiving said bit pulses, a first OR gate, means connecting the output of said first delay means to an input of said first OR gate, a second delay means connected to the output of said OR gate, a plurality of other delay means connected in series with the output of said second delay means, a third delay means, means responsive to said bit pulses for selectively connecting one or more of said plurality of other delay means in circuit between second and third delay means, means for coupling the output of said third delay means to another input of said first OR gate, and means responsive to an output from said first delay means for de-coupling the third delay means from said first OR gate.

References Cited in the file of this patent

UNITED STATES PATENTS

| | | |
|---|---|---|
| Re. 24,240 | Canfora | Nov. 27, 1956 |
| 2,444,782 | Lord | July 6, 1948 |
| 2,842,756 | Johnson | July 8, 1958 |
| 2,961,535 | Lanning | Nov. 22, 1960 |